US012234016B2

(12) United States Patent
Madison et al.

(10) Patent No.: US 12,234,016 B2
(45) Date of Patent: Feb. 25, 2025

(54) AERIAL FLUID DISPERSAL SYSTEMS INCLUDING ELECTRICALLY AND MECHANICALLY ACTUATED VALVES

(71) Applicant: Capstan Ag Systems, Inc., Topeka, KS (US)

(72) Inventors: Adam Madison, Lancaster, KS (US); Andrew J. Holtz, Heber, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 243 days.

(21) Appl. No.: 16/949,655

(22) Filed: Nov. 9, 2020

(65) Prior Publication Data

US 2021/0139147 A1 May 13, 2021

Related U.S. Application Data

(60) Provisional application No. 62/933,008, filed on Nov. 8, 2019.

(51) Int. Cl.
*B64D 1/18* (2006.01)
*B05B 1/16* (2006.01)

(52) U.S. Cl.
CPC ................ *B64D 1/18* (2013.01); *B05B 1/169* (2013.01)

(58) Field of Classification Search
CPC ........... B05B 1/169; B05B 17/08; B05B 1/20; B64D 1/16; B64D 1/18
See application file for complete search history.

(56) References Cited

U.S. PATENT DOCUMENTS 3,445,065 A * 5/1969 Waldrum ................. B64D 1/16 239/553.3
3,933,309 A * 1/1976 Odegaard ................. B05B 1/20 239/549
5,340,024 A * 8/1994 Fuller ..................... B05B 17/08 40/406
10,189,031 B2 1/2019 Funseth et al.
10,433,535 B2 * 10/2019 Hiddema ............ A01M 7/0071
2010/0032492 A1 * 2/2010 Grimm ............... A01M 7/0089 239/76
2015/0375247 A1 12/2015 Funseth et al.
2020/0128810 A1 4/2020 Price et al.
2020/0180941 A1 6/2020 Biasi et al.

* cited by examiner

*Primary Examiner* — Steven M Cernoch
(74) *Attorney, Agent, or Firm* — Armstrong Teasdale LLP

(57) ABSTRACT

An aerial fluid dispersal system includes a fluid reservoir configured to hold a quantity of fluid, a manifold assembly in fluid communication with the fluid reservoir, a fluid pump coupled in fluid communication with the fluid reservoir and the manifold assembly, a plurality of nozzle assemblies coupled in fluid communication with the manifold assembly, and a controller coupled to the fluid pump and the plurality of nozzle assemblies. Each nozzle assembly includes an electrically-actuated valve, a spray nozzle fluidly coupled downstream of the electrically-actuated valve, and a check valve fluidly coupled in series with the electrically-actuated valve. The controller is configured to control the operating parameter of the electrically-actuated valve of each nozzle assembly.

20 Claims, 11 Drawing Sheets

AERIAL FLUID DISPERSAL SYSTEMS INCLUDING ELECTRICALLY AND MECHANICALLY ACTUATED VALVES

CROSS-REFERENCE TO RELATED APPLICATIONS

This application claims priority to U.S. Provisional Patent Application Ser. No. 62/933,008, filed on Nov. 8, 2019, the disclosure of which is hereby incorporated by reference in its entirety.

BACKGROUND

The present disclosure relates generally to fluid dispersal systems, and particularly, to aerial fluid dispersal systems.

Aerial spraying is a well-known method of applying a wide variety of bulk materials, primarily in liquid form or a mixture of liquid and powder in a fluid propellant medium. Such spray materials can be dispensed in air currents, under liquid pressure, by gravity flow, or with any other suitable discharge means. Aerial spray application of bulk materials may offer a variety of potential advantages, including efficiency, uniformity of coverage, and flexibility to adapt spraying equipment to various conditions unique to the objects being sprayed and their particular environments.

Aerial agricultural spraying, however, is typically a relatively inefficient process. Factors which contribute to such inefficiencies include the susceptibility of sprayed materials to wind drift, overspray, and inaccurate placement on the intended target. Variations in ambient conditions such as wind, humidity levels, and temperature tend to reduce the uniformity and efficiency with which spray materials are applied to their intended targets. In particular, the non-uniformity with which spray materials are applied may in some cases be exacerbated by aerial spraying. However, the inherent difficulties associated with large-scale spraying operations may be balanced against the relative efficiencies which are achieved by covering larger areas more rapidly with wide-swath spraying equipment.

At least some known systems have implemented pulse-width-modulated (PWM) valves to address some of the aforementioned challenges with aerial agricultural spraying. For example, some aerial application systems include a plurality of PWM valves, each coupled to a nozzle or integrated into a nozzle assembly, that are controlled (e.g., by varying the duty cycle and/or frequency of the PWM valve) to control the application rate and distribution profile of the spray liquid, and/or to maintain a consistent droplet size spectrum across the spray swath.

While the use of PWM valves has helped alleviate some of the challenges with aerial agricultural spraying, such systems may not be fully compatible with conventional leak prevention systems employed on aerial application systems. For example, some conventional aerial application systems include a drip check valve, typically in the form of a diaphragm check valve, in combination with a fluid control system that generates suction throughout the boom (colloquially referred to as "suck-back") when material is not being applied. The combination of the drip check valve and the suction throughout the boom generally prevents any material from inadvertently leaking out of the nozzles of the aerial application system. However, conventional drip check valves are generally large and, consequently, can be difficult to effectively implement in combination with PWM valves. For example, the added size and shape of conventional drip check valves may make it difficult to fit an entire nozzle assembly, including the drip check valve and PWM valve, within a protective shell of the aerial application system. Additionally, conventional fluid control systems that generate suction when not actively applying material could have a tendency to lift and potentially unseat the valve member (e.g., poppet) of PWM valves.

Accordingly, a need exists for improved leak prevention systems for aerial application systems that are compatible with PWM valves.

BRIEF DESCRIPTION

In one aspect, an aerial fluid dispersal system includes a fluid reservoir configured to hold a quantity of fluid, a manifold assembly in fluid communication with the fluid reservoir, a fluid pump coupled in fluid communication with the fluid reservoir and the manifold assembly, a plurality of nozzle assemblies coupled in fluid communication with the manifold assembly, and a controller coupled to the fluid pump and the plurality of nozzle assemblies. Each nozzle assembly includes an electrically-actuated valve, a spray nozzle fluidly coupled downstream of the electrically-actuated valve, and a check valve fluidly coupled in series with the electrically-actuated valve. The controller is configured to control the operating parameter of the electrically-actuated valve of each nozzle assembly.

In another aspect, a method of dispensing fluid using an aerial fluid dispersal system is provided. The aerial fluid dispersal system includes a manifold assembly, a fluid reservoir, and a fluid pump. The method includes generating a flow of pressurized fluid in the manifold assembly using the fluid pump. The fluid pump is coupled in fluid communication with the fluid reservoir and the manifold assembly. The method also includes dispensing the pressurized fluid through a plurality of nozzle assemblies coupled in fluid communication with the manifold assembly. Each nozzle assembly of the plurality of nozzle assemblies includes an electrically-actuated valve, a spray nozzle fluidly coupled downstream of the electrically-actuated valve and configured to emit the pressurized fluid based on an operating parameter of the electrically-actuated valve, and a check valve fluidly coupled in series with the electrically-actuated valve. The method further includes controlling an operating parameter of the electrically-actuated valve of each nozzle assembly using a controller coupled to the fluid pump and the plurality of nozzle assemblies.

In yet another aspect, an aerial fluid dispersal system includes a fluid reservoir configured to hold a quantity of fluid, a manifold assembly in fluid communication with the fluid reservoir, and a fluid pump coupled in fluid communication with the fluid reservoir and the manifold assembly for generating a flow of pressurized fluid in the manifold assembly. The aerial fluid dispersal system also includes a plurality of nozzle assemblies coupled in fluid communication with the manifold assembly. Each nozzle assembly of the plurality of nozzle assemblies includes an electrically-actuated valve and a check valve fluidly coupled in series with the electrically-actuated valve. The check valve is activated when a pressure differential across the check valve exceeds a threshold pressure. The aerial fluid dispersal system further includes a controller coupled to the fluid pump and the plurality of nozzle assemblies. The controller is configured to control the operating parameter of the electrically-actuated valve of each nozzle assembly.

These and other features, aspects, and advantages of the present disclosure will become better understood with reference to the following description and appended claims.

The accompanying drawings, which are incorporated in and constitute a part of this specification, illustrate embodiments of the disclosure and, together with the description, serve to explain the principles of the disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Figure 1:
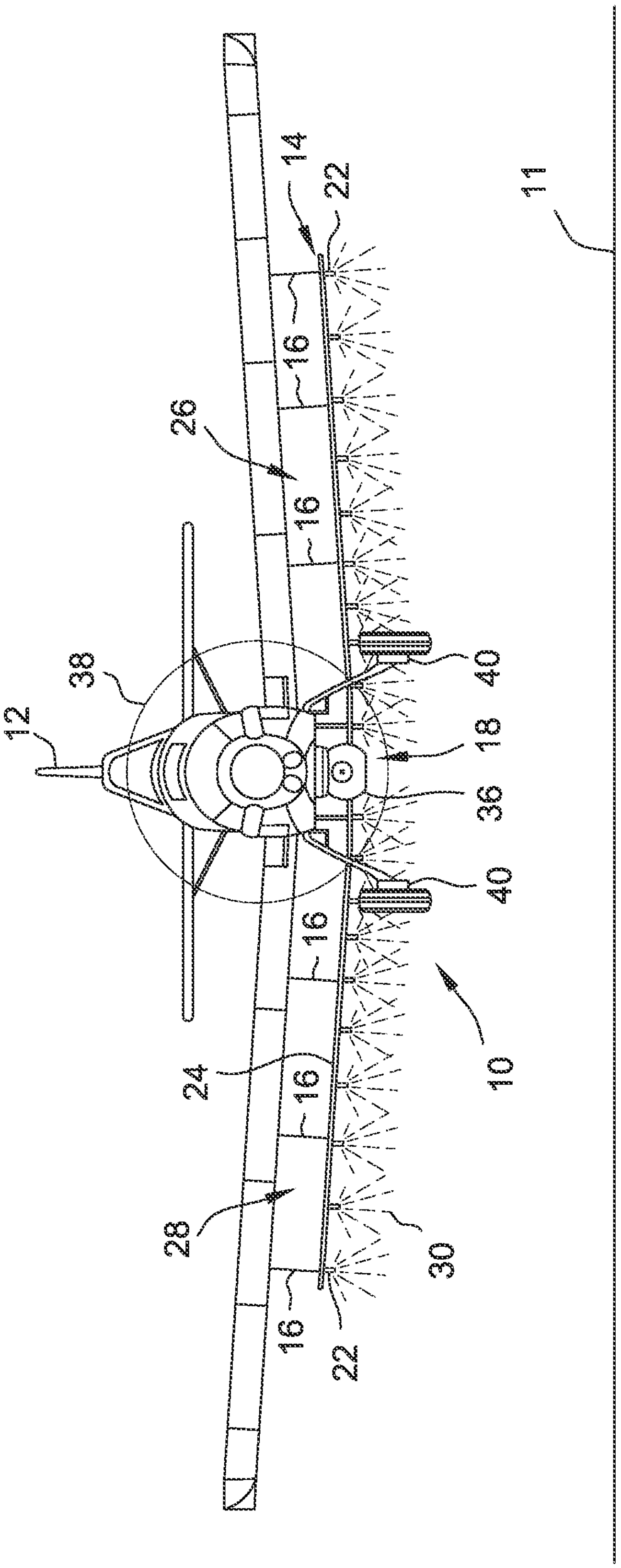
FIG. 1 is a front view of an example fluid dispersal system coupled to an aerial vehicle.
Figure 2:
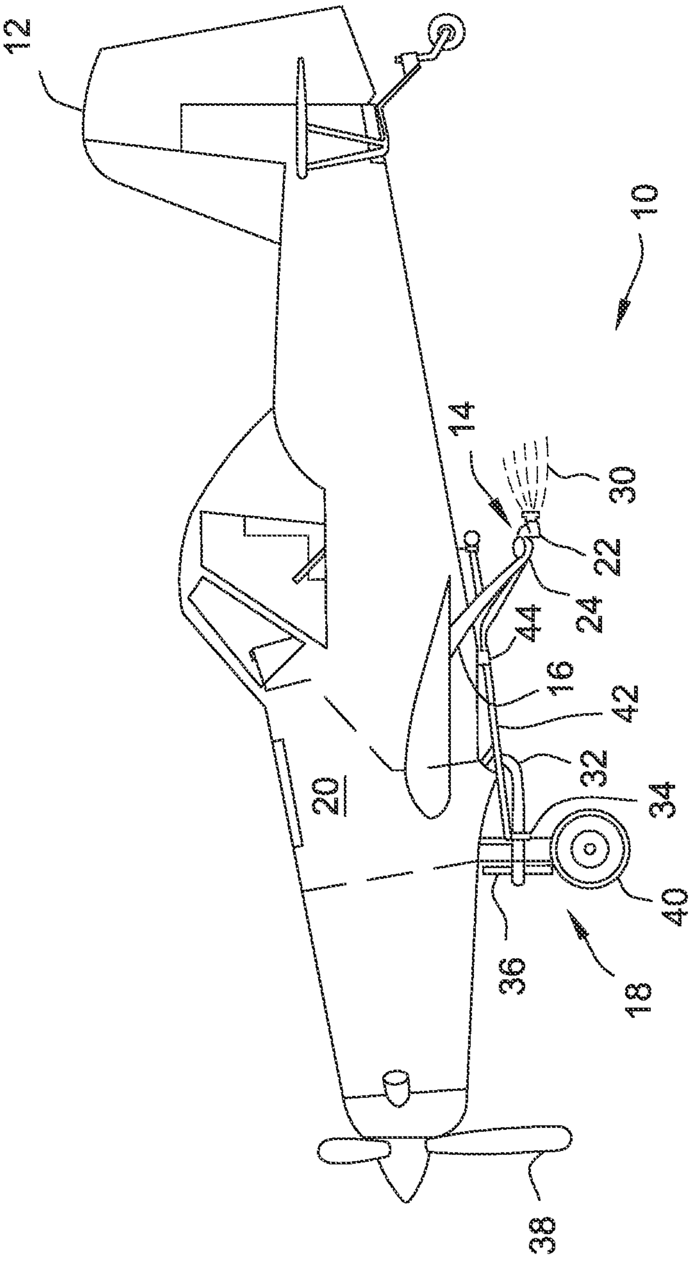
FIG. 2 is a side view of the fluid dispersal system coupled to the aerial vehicle.
Figure 3:
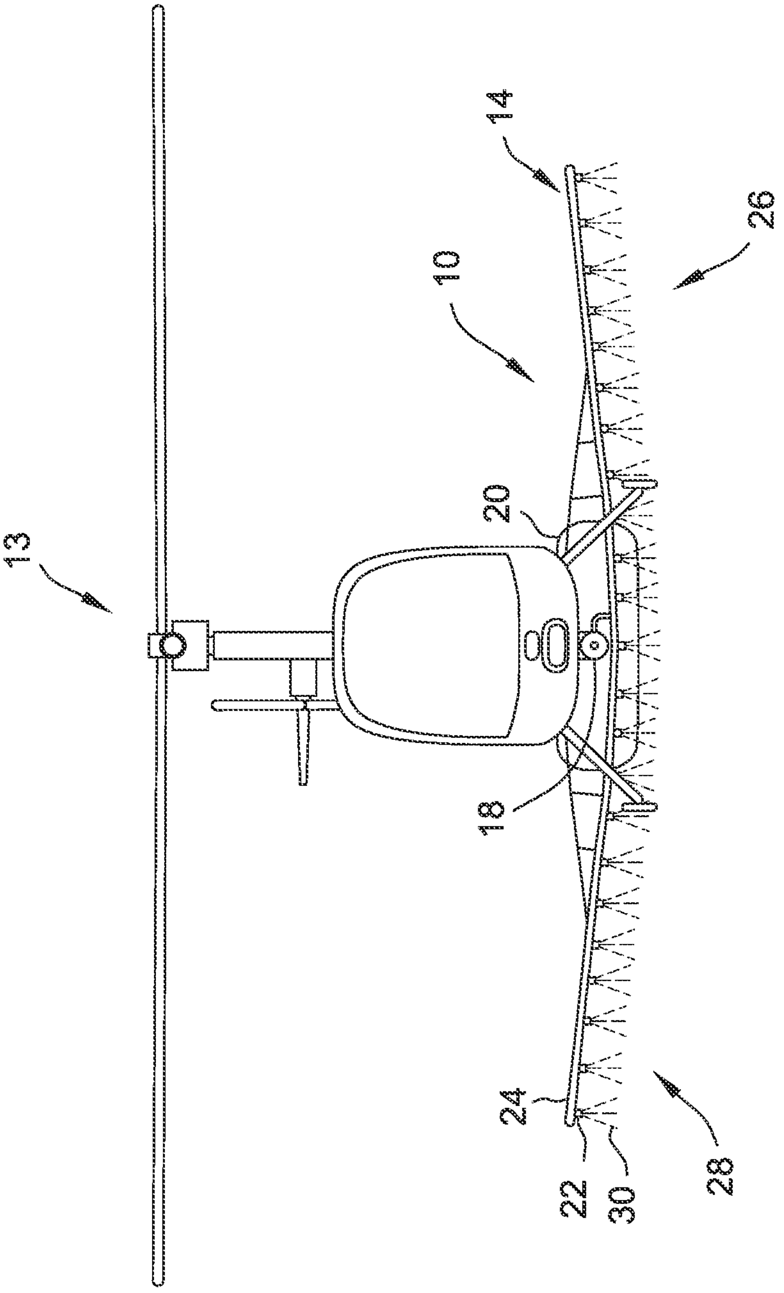
FIG. 3 is a front view of an example rotary aerial vehicle that can be used in combination with the fluid dispersal system shown in FIG. 1.

FIG. 1 is a front view of an example fluid dispersal system 10 coupled to an aerial vehicle 12. FIG. 2 is a side view of fluid dispersal system 10 coupled to aerial vehicle 12. In the example embodiment, aerial vehicle 12 is a conventional fixed-wing airplane used for aerial application of materials, such as powdered or liquid insecticide, fertilizer, herbicide, etc., onto crops from the air. Although aerial vehicle 12 is shown as a low-wing airplane, aerial vehicle 12 may be any type of aerial vehicle suitable for aerial application of materials onto crops, including for example, and without limitation, high-wing monoplanes, biplanes, rotary aerial vehicles, and the like. For example, FIG. 3 is a front view of an example rotary aerial vehicle 13 that can be used in combination with fluid dispersal system 10. In some embodiments, aerial vehicle 12 may be a drone or other unmanned aerial vehicle 12.

In addition, fluid dispersal system 10 is not limited to use with aerial vehicle 12. For example, in some embodiments, fluid dispersal system 10 may be coupled to a vehicle configured to move fluid dispersal system 10 along the ground 11. In further embodiments, fluid dispersal system 10 may be self-propelled and/or configured to operate at a fixed location.

With reference to FIGS. 1 and 2, in the example embodiment, aerial vehicle 12 and/or fluid dispersal system 10 may include a global positioning system (e.g., a GPS receiver) for providing location and velocity information related to aerial vehicle 12 and/or fluid dispersal system 10, and/or automated control of aerial vehicle 12 and/or fluid dispersal system 10. In some embodiments, the global positioning system is used to monitor, for example, and without limitation, a speed, a height, a position, a travel direction, an ascent or descent, etc. of vehicle 12 and/or fluid dispersal system 10.

In the example embodiment, fluid dispersal system 10 is coupled to and/or integrated with aerial vehicle 12. Fluid dispersal system 10 includes a boom assembly 14 coupled to aerial vehicle 12 by one or more hangers 16, a pump assembly 18, and a fluid reservoir 20. In the example embodiment, fluid reservoir 20 is enclosed within aerial vehicle 12. Alternatively, fluid reservoir 20 can be an external fluid reservoir coupled to a portion of the aerial vehicle. For example, as shown in FIG. 3, fluid reservoir 20 may be coupled to the external portion of rotary aerial vehicle 13. In the example embodiment, boom assembly 14 includes a plurality of nozzle assemblies 22 coupled to a manifold assembly or boom pipe 24. Nozzle assemblies 22 are coupled in flow communication with fluid reservoir 20 through boom pipe 24. Boom pipe 24 may include, for example, a left boom section 26 and a right boom section 28. In one embodiment, boom sections 26 and 28 may be defined by sets or banks of nozzle assemblies 22 defined by a programmable map loaded into a controller 60 (shown in FIG. 8). Furthermore, in some embodiments, boom pipe 24 may include any number of boom sections. Nozzle assemblies 22 corresponding to such boom sections may be controlled as a set or individually by controller 60.

Further, in the example embodiment, fluid reservoir 20 holds a quantity of material 30, such as, and without limitation, a liquid, a mixture of liquid and powder, and/or other material, to be dispensed by fluid dispersal system 10, for example, onto a crop. In some embodiments, material 30 may be water or an agrochemical such as an herbicide or a pesticide, and may be dispensed by nozzle assemblies 22 onto, for example, the crop and/or the ground. The quantity of material 30 held in fluid reservoir 20 generally flows through boom pipe 24 to nozzle assemblies 22. More specifically, pump assembly 18 is configured to selectively draw a flow of material 30 from reservoir 20 through an inlet conduit 32 and pressurize the flow of material 30. The terms "pipe" and "conduit," as used herein, include any type of tube made of any suitable material such as metal, rubber, or plastic, for channeling material 30 therethrough.

Pump assembly 18 includes, for example, and without limitation, a centrifugal pump 34 driven by a fan 36 positioned in the slipstream of a propeller 38 of aerial vehicle 12. For example, as shown in FIG. 1, pump assembly 18 is mounted to aerial vehicle 12 between the landing gear 40. In alternative embodiments, pump assembly 18 is any type of pump, such as, and without limitation, a hydraulic drive pump and/or an electrically operated pump, that enables fluid dispersal system 10 to function as described herein. For example, in some embodiments, pump assembly 18 is a high pressure pump capable of pressurizing material 30 to pressures in the range between about 100 pounds per square inch (psi.) and about 400 psi. In other examples, pump assembly 18 may include more than one pump coupled in serial arrangement to facilitate increasing the pressure of material 30. In the example embodiment, pump assembly 18 is mounted to aerial vehicle 12 below reservoir 20 to facilitate the pump assembly 18 continuously receiving material 30 from reservoir 20, i.e., to ensure pump assembly 18 remains primed.

Pump assembly 18 provides the pressurized flow of material 30 to boom pipe 24 through an outlet conduit 42. Pressurized material 30 flows through boom pipe 24 to nozzle assemblies 22, where it is dispersed into the air. In certain embodiments, outlet conduit 42 includes a metering device 44, such as a variable flow-area valve, for regulating the flow of material 30 to boom pipe 24.

In the example embodiment, nozzle assemblies 22 include direct acting solenoid valve equipped nozzles and are spaced apart from each other along a length of boom pipe 24. Controller 60 (shown in FIG. 8) is coupled in communication with nozzle assemblies 22 to control operation of nozzle assemblies 22. In addition, in some embodiments, pump assembly 18 may include a pulse width modulation controlled pump 34 that is configured to provide a desired pressure of pressurized material 30 flowing through fluid dispersal system 10. In such embodiments, pump assembly 18 may be coupled in communication with controller 60. Controller 60 may be configured to vary operating parameters of pump assembly 18, such as a pulse frequency and/or a duty cycle, to facilitate obtaining a desired pressure of material 30 in fluid dispersal system 10. In some embodiments, controller 60 may control the pitch of fan 36 of pump assembly 18 to achieve variable system pressures of material 30. In the example embodiment, material 30 flows through nozzle assemblies 22 and may be dispensed onto the crop and/or the ground in different ways. For example, and without limitation, material 30 may be emitted from nozzle assemblies 22 in a pulsed pattern.

Figure 4:
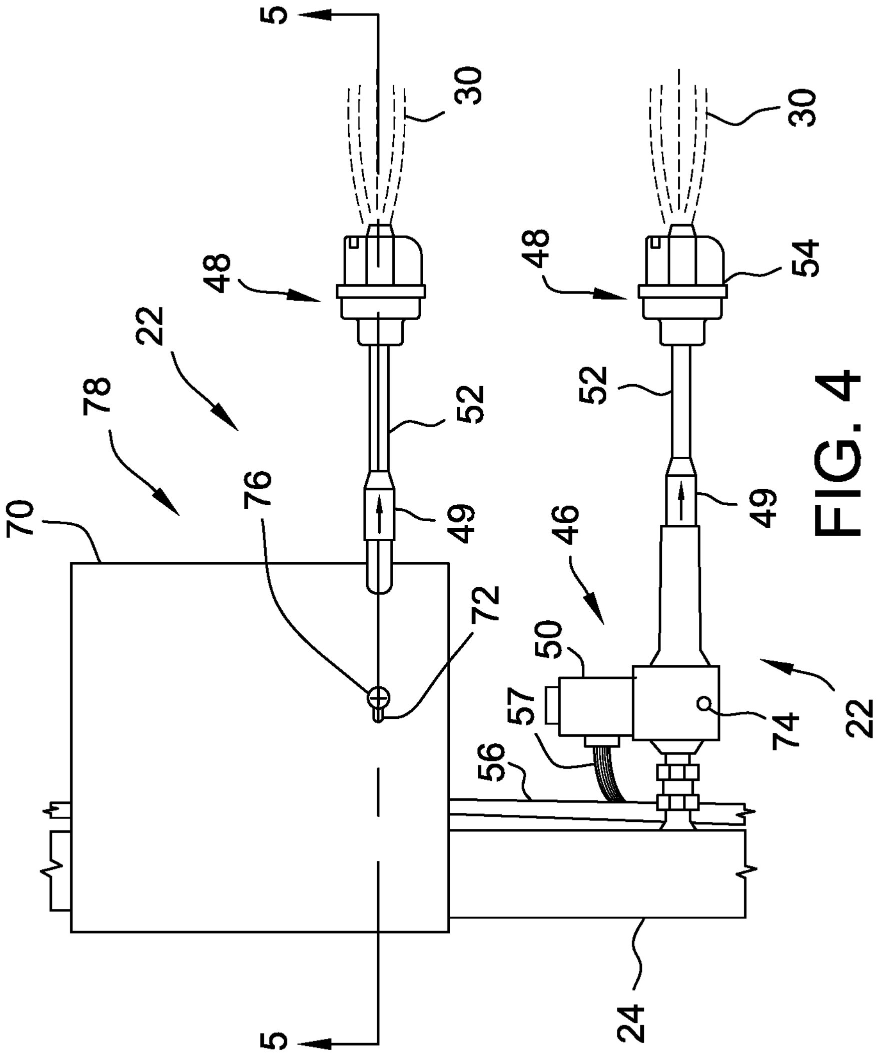
FIG. 4 is a schematic top view of an example nozzle assembly suitable for use with the fluid dispersal system shown in FIG. 1.
Figure 5:
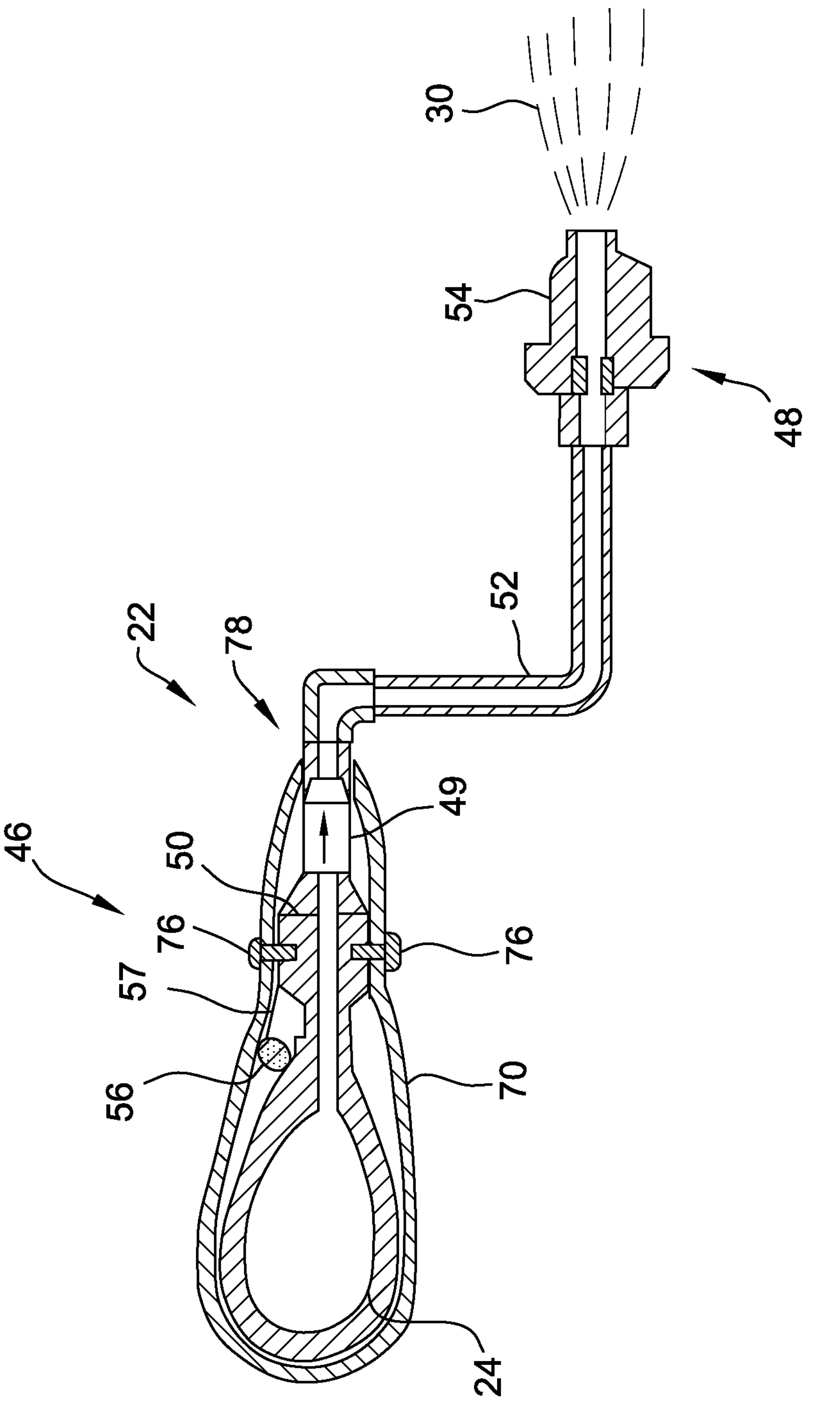
FIG. 5 is a sectional view of the nozzle assembly shown in FIG. 4, taken along line 5-5.

FIG. 4 is a schematic top view of nozzle assembly 22 suitable for use with fluid dispersal system 10 (shown in FIG. 1). FIG. 5 is a sectional view of nozzle assembly 22 taken along line 5-5. In the example embodiment, nozzle assembly 22 is coupled to boom pipe 24 for receiving material 30 therethrough. Nozzle assembly 22 includes an electrically-actuated valve assembly 46, a spray nozzle 48, and a mechanically-actuated valve 49 fluidly coupled in series with electrically-actuated valve assembly 46. Spray nozzle 48 may have any suitable nozzle configuration known in the art. For example, spray nozzle 48 may include a spray tip (not shown), such as a flat fan tip, cone tip, straight stream tip and/or any other suitable spray tip that enables nozzle assembly 22 to function as described herein. Similarly, valve assembly 46 may generally have any suitable valve configuration known in the art, for example, and without limitation, a latching solenoid valve, 2WNC solenoid valve, pilot actuated solenoid valve, flipper solenoid valve, and/or the like.

Figure 8:
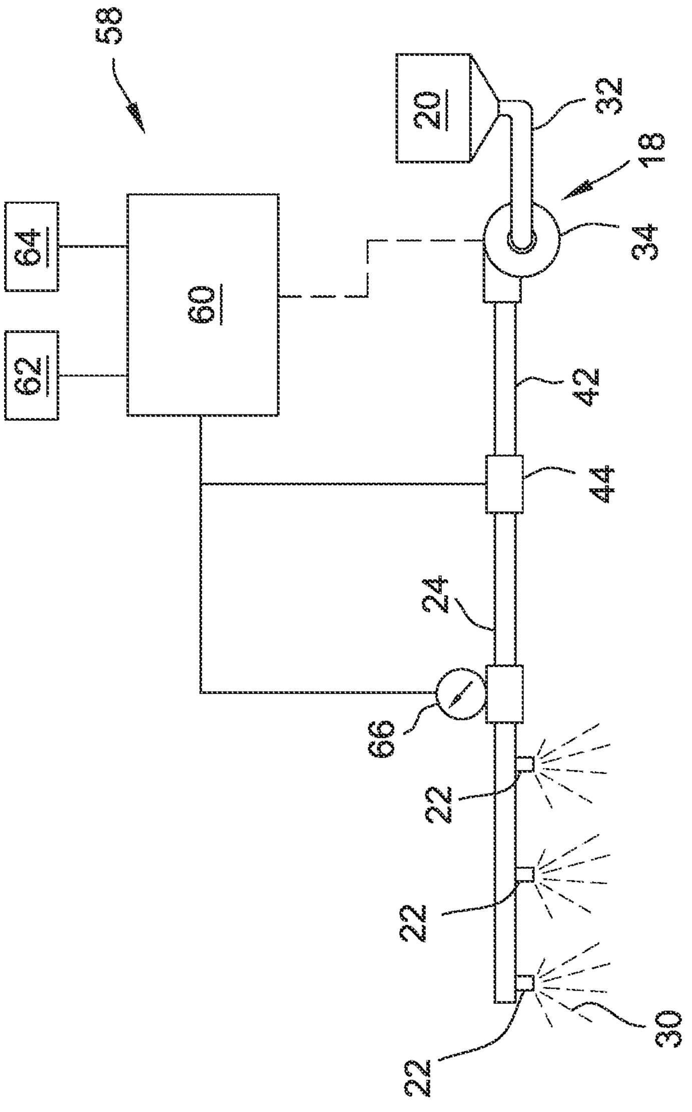
FIG. 8 is a schematic view of the fluid dispersal system shown in FIG. 1, and including a control system.

In the example embodiment, electrically-actuated valve assembly 46 is a direct acting solenoid valve that includes an actuator 50 configured to pulse with a timing, duration, frequency, and duty cycle determined by controller 60 (shown in FIG. 8). In some embodiments, the pulse timing, duration, and/or frequency are suitable to reduce dynamic effects of pulsing on the upstream system pressure and flow, therefore creating a controlled variable resistance to flow. In alternative embodiments, valve assembly 46 may be pneumatically or hydraulically actuated. The term "duty cycle," as used herein, refers to the cycle of operation of the valve assembly operating intermittently rather than continuously and includes the percentage of time the valve assembly is open divided by the total operation time. The duty cycle controls the flow rate or emission rate of material 30 through nozzle assembly 22 in a rapid on/off manner. In some embodiments, spray nozzle 48 is configured to be mounted to and/or integrated within a portion of valve assembly 46.

In one embodiment, controller 60 is configured to regulate the timing and duration of valve assembly 46, and in particular, actuator 50, to control the phasing between nozzles assemblies 22 to facilitate reducing harmonics and/or vibrations of boom assembly 14. For example, the phasing and or timing of nozzle assemblies 22 can be regulated to facilitate reducing and/or eliminating water hammering in boom pipe 24. The phrase "water hammering" as used herein includes a sudden change in flow of material 30, which can result in shock waves propagating through fluid dispersal system 10. Flow changes can occur due to operation of nozzles assemblies 22, starting and stopping of pump assembly 18, and/or directional changes caused by fittings between nozzles assemblies 22 and boom pipe 24, for example.

In one particular embodiment, valve assembly 46 may be configured the same as or similar to the valves disclosed in U.S. Pat. No. 9,435,458 (the '458 patent), filed on Mar. 2, 2012, and entitled "Electrically Actuated Valve for Control of Instantaneous Pressure Drop and Cyclic Durations of Flow," which is incorporated by reference herein in its entirety for all purposes. Specifically, the '458 patent discloses a solenoid valve in which the valve poppet is configured to be pulsed such that the cyclic durations of the poppet control the average flow rate through the valve. For example, the valve may be operated with a pulse-width modulation, in which the poppet moves from a sealed position to an open position relative to the valve inlet and/or valve outlet and the duty cycle of the pulse controls the average flow rate. Additionally, the pressure drop across the valve may be controlled during each pulse of the poppet by regulating the position to which the poppet is moved relative to the valve inlet and/or the valve outlet. For instance, the displacement of the poppet may be regulated such that the valve is partially opened during each pulse.

In the example embodiment, spray nozzle 48 includes a nozzle body portion 52, which receives material 30 flowing through boom pipe 24, and a nozzle head 54 attached to and/or formed integrally with nozzle body portion 52. Nozzle head 54 is configured for emitting material 30 from spray nozzle 48 onto the crop and/or the ground.

In the example embodiment, mechanically-actuated valve 49 is a check valve (i.e., a pressure activated valve) configured to inhibit or prevent fluid from leaking out of valve assembly 46 and spray nozzle 48 when valve assembly 46 is shut off. More specifically, mechanically-actuated valve 49 is a check valve that is activated when a pressure differential across the check valve exceeds a threshold pressure, also referred to as the "cracking pressure" of the check valve. Mechanically-actuated valve 49 of the example embodiment is an in-line check valve. That is, the inlet and outlet of mechanically-actuated valve 49 are generally co-axial with one another or arranged on a common axis, and the valve member of mechanically-actuated valve 49 moves along the common axis. Fluid generally enters and exits the in-line mechanically-actuated valve 49 along the same axis. Mechanically-actuated valve 49 may generally include any suitable in-line check valve that enables fluid dispersal system 10 to function as described herein. Suitable check valves include, for example without limitation, in-line piston check valves and in-line ball check valves. As compared to conventional drip check valves, in-line mechanically-actuated valve 49 is generally more compact and occupies less space, and thereby facilitates implementing electrically-actuated valve assembly 46 in combination with mechanically-actuated valve 49 in aerial application systems.

In the example embodiment, mechanically-actuated valve 49 is fluidly connected downstream of electrically-actuated valve assembly 46. That is, mechanically-actuated valve 49 is fluidly coupled between electrically-actuated valve assembly 46 and spray nozzle 48. In other embodiments, mechanically-actuated valve 49 may be fluidly coupled upstream of electrically-actuated valve assembly 46, such as between boom pipe 24 and electrically-actuated valve assembly 46 (see, e.g., FIGS. 6 and 7).

Mechanically-actuated valve 49 may have any suitable cracking pressure (i.e., the pressure differential at which mechanically-actuated valve 49 opens) that enables fluid dispersal system 10 to function as described herein. For example, mechanically-actuated valve 49 may have a cracking pressure of between 1 pound per square inch (psi) to 20 psi, between 1 psi to 10 psi, between 3 psi to 15 psi, between 5 psi to 20 psi, between 1 psi to 5 psi, between 3 psi to 10 psi, and between 5 psi to 15 psi. In one particular embodiment, mechanically-actuated valve 49 has a cracking pressure of 5 psi. In another particular embodiment, mechanically-actuated valve 49 has a cracking pressure of 10 psi.

In the example embodiment, an electrical cable assembly 56 extends along boom pipe 24 and includes a plurality of connectors 57. Each actuator 50 is connected to cable assembly 56 by a respective connector 57. Cable assembly 56 is also coupled to controller 60 and facilitates transmitting power and control signals from controller 60 to each actuator 50.

To facilitate protecting each nozzle assembly 22 and each cable assembly 56 from the high-speed slipstream generated by aerial vehicle 12, one or more airfoil-shaped shells 70 are coupled to valve assemblies 46. In particular, in the example embodiment, a single shell 70 is coupled to each discrete valve assembly 46. As best shown in FIG. 5, shell 70 is formed from a sheet material and is shaped to enclose and generally conform to boom pipe 24, valve assembly 46, and mechanically-actuated valve 49. For clarity, only one shell 70 is shown in FIG. 4. Shell 70 is configured to enclose a single valve assembly 46 and associated mechanically-actuated valve 49. As such, a plurality of shells 70 are coupled to the valve assemblies 46 and extend along boom pipe 24 to create a protective assembly extending along the length of boom pipe 24 and protecting each valve assembly 46 and mechanically-actuated valve 49. The individual shells 70 enable a single shell 70 to be removed from boom pipe 24 and a respective valve assembly 46 to facilitate maintenance and/or replacement of a single valve assembly 46 and/or mechanically-actuated valve 49 without removing the entire protective shell from boom pipe 24. The use of valve 49 or valve 108 (shown in FIG. 9) instead of a traditional valve facilitates enclosing components of nozzle assembly 22 (e.g., valve assembly 46 and mechanically-actuated valve 49 or valve 108) within the protective cavity defined by shell 70.

Shells 70 include a slot 72 formed through the top and bottom walls of shell 70. Each slot 72 is configured to generally align with a respective connection point 74 of valve assembly 46. In the example embodiment, connection point 74 includes a female threaded portion defined in valve assembly 46 for receiving, for example, a threaded fastener 76 therethrough.

Shell 70 may be formed from a single piece of sheet material and shaped to closely conform to boom pipe 24, valve assembly 46, and mechanically-actuated valve 49, as described above. In particular, shell 70 has a general airfoil shape that has a trailing edge portion 78 defined by two edges of the sheet material. Shell 70 may be coupled to boom pipe 24 and valve assembly 46 by displacing the sheet material edges defining trailing edge portion 78 apart and sliding shell 70 over boom pipe 24, valve assembly 46, and mechanically-actuated valve 49. A fastener 76 is coupled to each connection point 74 of valve assembly 46 to facilitate retaining shell 70 in place.

Figure 6:
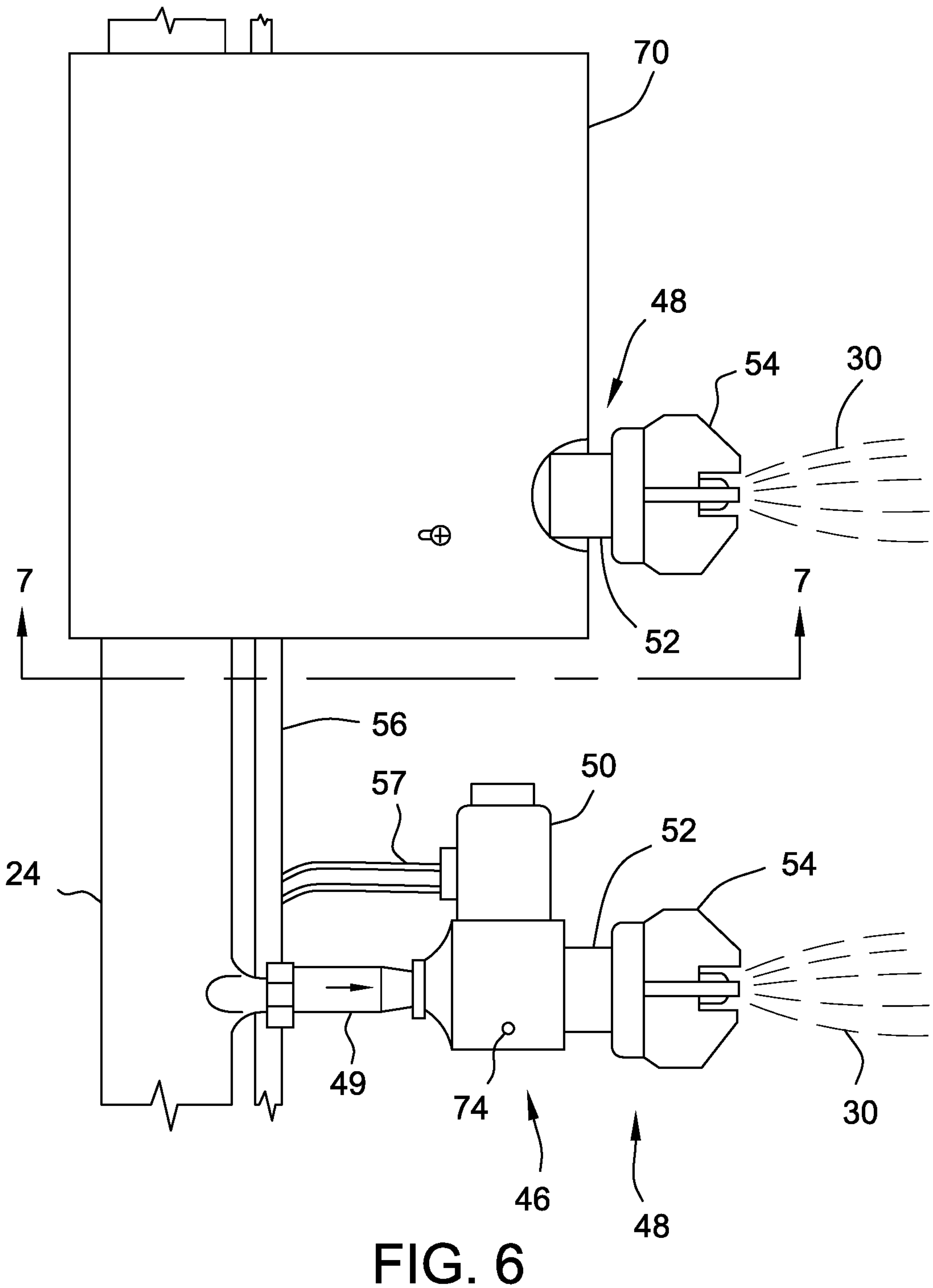
FIG. 6 is a schematic top view of an alternative nozzle assembly.
Figure 7:
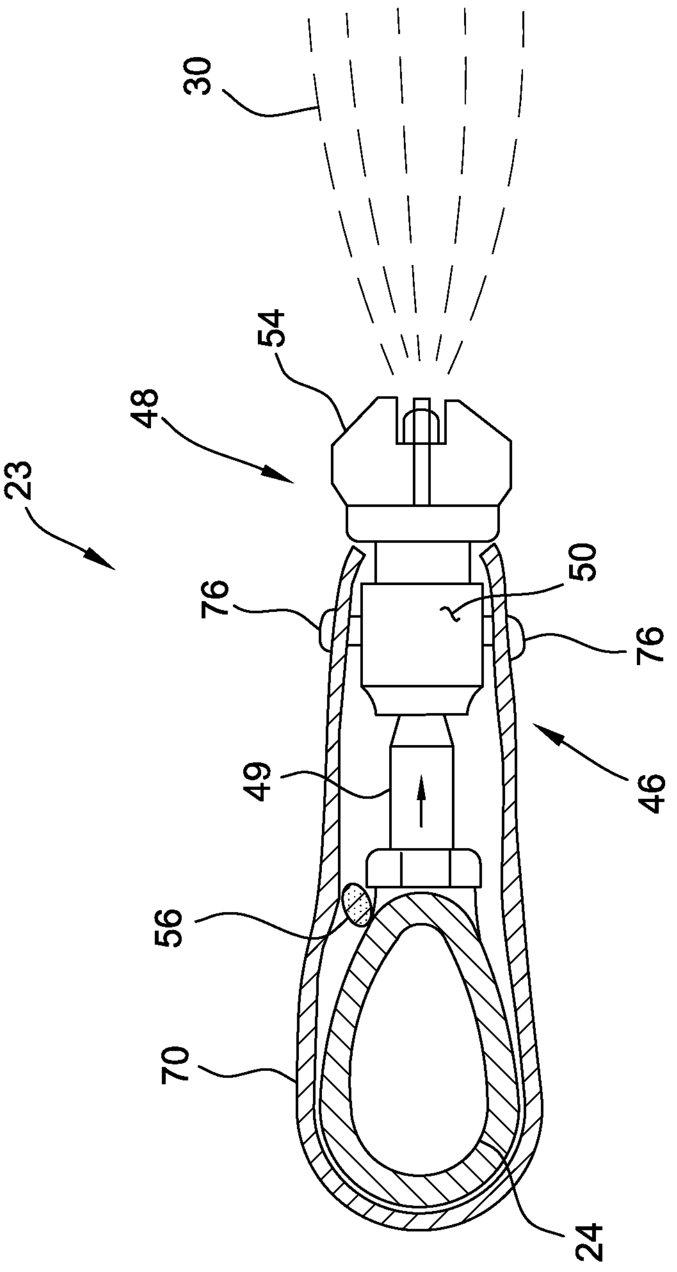
FIG. 7 is a sectional view of the alternative nozzle assembly shown in FIG. 6, taken along line 7-7.

FIG. 6 is a schematic top view of an alternative nozzle assembly 23 in which the mechanically-actuated valve 49 is fluidly connected upstream of the electrically-actuated valve assembly 46 (i.e., between the boom pipe 24 and the electrically-actuated valve assembly 46). FIG. 7 is a sectional view of nozzle assembly 23 taken along line 7-7. In the example embodiment, nozzle assembly 23 is similar to nozzle assembly 22, except mechanically-actuated valve 49 is located upstream of electrically-actuated valve assembly 46. In addition, nozzle assembly 23 is illustrated with a spray nozzle 48 extending straight out of valve assembly 46.

FIG. 8 is a schematic view of fluid dispersal system 10 including a control system 58. Control system 58 generally includes controller 60, metering device 44, a position device 62, and at least one atmospheric data device 64. In some embodiments, fluid dispersal system 10 may also include one or more pressure regulators 66. In the example embodiment, control system 58 may be used with or incorporate one or more aspects of the equipment, such as aerial vehicle 12, aerial vehicle 13, and/or fluid dispersal system 10, described above with reference to FIGS. 1-5. In addition, in some embodiments, control system 58 may include a respective atmospheric data device 64 corresponding to a position of each respective nozzle assembly 22 and/or set of nozzle assemblies.

In operation, material 30 flows from fluid reservoir 20 to centrifugal pump 34 through inlet conduit 32. Material 30 is pressurized by centrifugal pump 34 and channeled to metering device 44 through outlet conduit 42. Material 30 then flows through metering device 44 and, in some embodiments, pressure regulator 66, to boom pipe 24. Material 30 then flows to nozzle assemblies 22 where it is dispensed onto the crop and/or the ground.

In the illustrated embodiment, nozzle assemblies 22 are coupled in communication with control system 58. In particular, each actuator 50 of each valve assembly 46 is coupled in communication with controller 60. Controller 60 controls one or more operating parameters of each valve assembly 46, for example, and without limitation, a timing, a duration, a duty cycle percentage, and/or a pulse frequency of the valve assembly. In one embodiment, valve assembly 46 has an operational frequency in the range of between and including about 0 Hertz (Hz) and about 15 Hz, and can have a duty cycle in the range between and including 0% to 100%. In another embodiment, valve assembly 46 has an operational frequency in the range of between and including about 0 Hertz (Hz) and about 50 Hz, and can have a duty cycle in the range between and including 0% to 100%.

In one particular embodiment, controller 60 may be configured the same as or similar to the controller disclosed in U.S. Pat. No. 8,191,795 (the '795 patent), filed on Jul. 31, 2009, and entitled "Method and System to Control Nozzles While Controlling Overall System Flow and Pressure," which is incorporated by reference herein in its entirety for all purposes. Specifically, the '795 patent discloses using a "flow factor" for individually scaling fluid flow from each valve assembly 46. For example, the controller is configured to control the rate at which the liquid agricultural product is emitted from each valve based upon the calculated flow factor for each valve.

Additionally or alternatively, control system 58 and controller 60 may be configured to control fluid dispersal system 10 in accordance with one or more control methods disclosed in U.S. patent application Ser. No. 15/968,883, filed May 2, 2018, and entitled "Systems and Methods to Control Aerial Distribution of Materials," which is incorporated by reference herein in its entirety for all purposes.

In the example embodiment, fluid dispersal system 10 is not limited to any particular number or configuration of nozzle assemblies 22. In addition, as described above, in other embodiments, fluid dispersal system 10 may not include pressure regulators 66, or alternatively may include any other suitable means for measuring and/or regulating pressure in boom pipe 24. In still other embodiments, pump assembly 18, and in particular, centrifugal pump 34, may not be a pulse width modulation controlled pump, and the flow rate of material 30 through fluid dispersal system 10 may instead be regulated by a flow valve (not shown), controlled by controller 60 and/or a user of fluid dispersal system 10, and positioned downstream of centrifugal pump 34.

In the example embodiment, controller 60 generally includes any suitable computing device and/or other processing unit, including any suitable combination of computers, processing units, and/or the like that may be operated independently or in connection within one another. Thus, controller 60 includes one or more processor(s) and associated memory device(s) configured to perform a variety of computer-implemented functions including, but not limited to, the calculations disclosed herein. As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, controlling the duty cycle and/or pulse duration of valve assembly 46.

Figure 9:
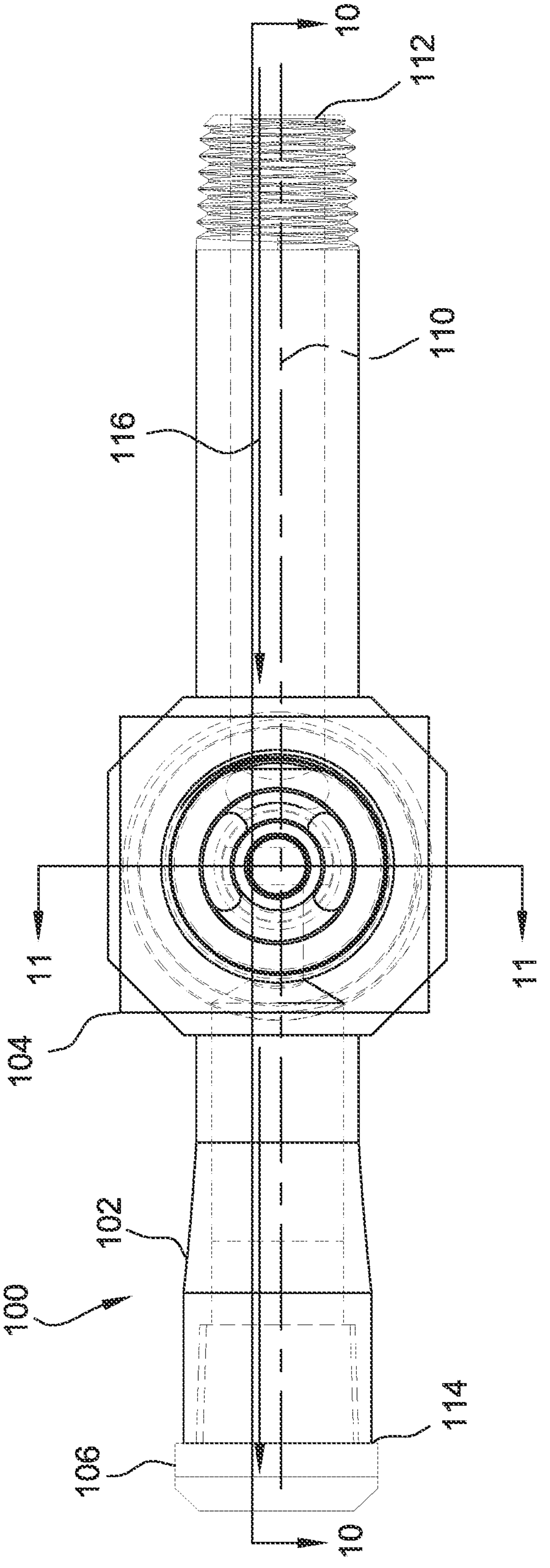
FIG. 9 is a schematic top view of an alternative valve assembly suitable for use with the fluid dispersal system shown in FIG. 1.
Figure 10:
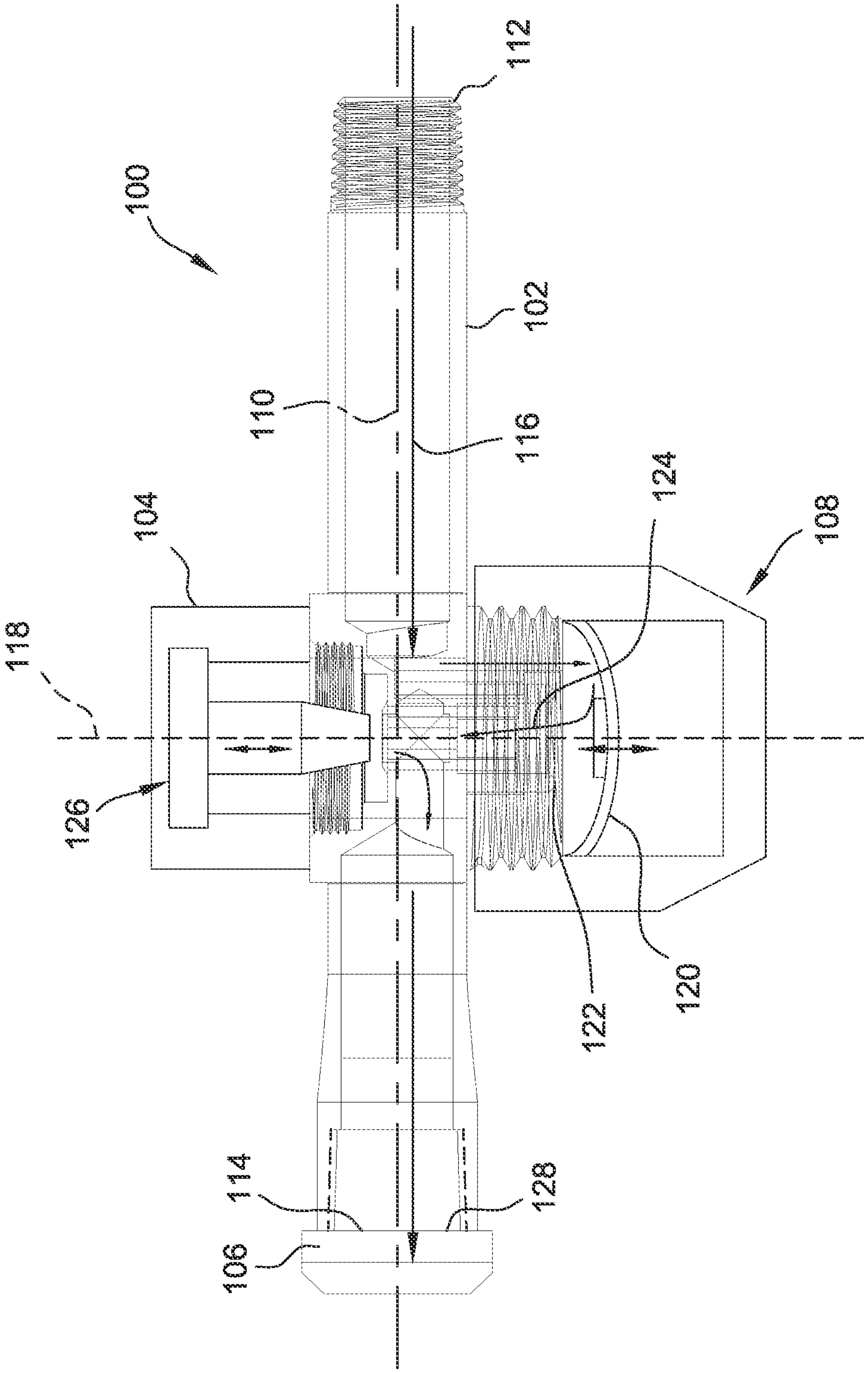
FIG. 10 is a sectional view of the valve assembly shown in FIG. 9, taken along line 10-10.
Figure 11:
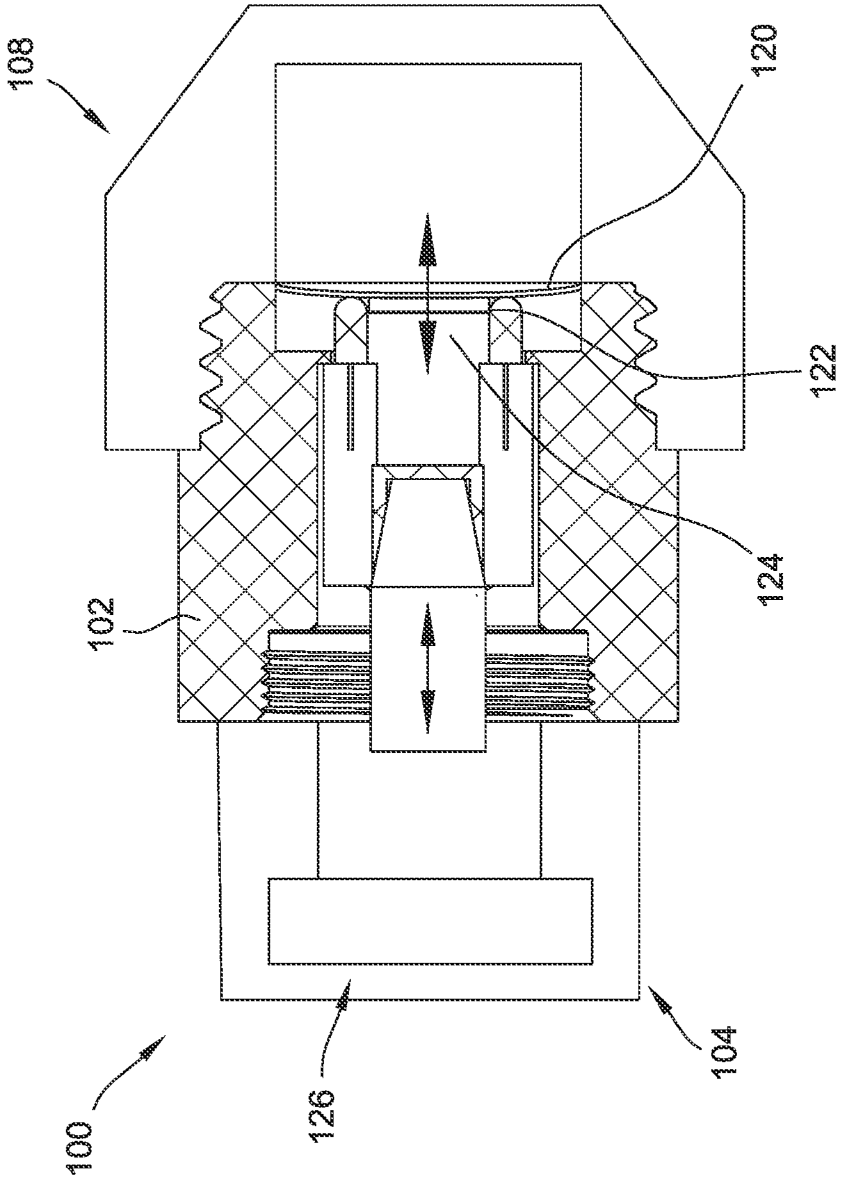
FIG. 11 is a sectional view of a portion of the nozzle assembly shown in FIG. 9, taken along line 11-11.

FIG. 9 is a schematic top view of a nozzle assembly 100 suitable for use with fluid dispersal system 10 (shown in FIG. 1). FIG. 10 is a sectional view of nozzle assembly 100 taken along line 10-10. FIG. 11 is a sectional view of a portion of nozzle assembly 100, taken along line 11-11. In the example embodiment, nozzle assembly 100 includes a body 102, an electrically-actuated valve assembly 104, a spray nozzle 106, and a mechanically-actuated valve 108 fluidly coupled in series with electrically-actuated valve assembly 104. Body 102 extends along a longitudinal axis 110 from a first, inlet end 112 that attaches to a boom pipe, such as boom pipe 24 (shown in FIG. 4), to a second, outlet end 114 that is configured to receive spray nozzle 106. Body 102 defines a fluid flow path 116 extending at least in part longitudinally between first end 112 and second end 114. In some embodiments, body 102 is formed as an integral or unitary piece, such as by casting or molding. Body 102 facilitates incorporating electrically-actuated valve assembly 104 and mechanically-actuated valve 108 into a single assembly having a compact size and shape. Electrically-actuated valve assembly 104 and mechanically-actuated valve 108 are coupled to body 102 between first end 112 and second end 114 and in fluid communication with flow path 116. Specifically, in the example embodiment, electrically-actuated valve assembly 104 and mechanically-actuated valve 108 are coupled to body 102 on opposite sides of longitudinal axis 110 and are oriented along a transverse axis 118 of body 102.

In the example embodiment, mechanically-actuated valve 108 is a check valve (i.e., a pressure activated valve) configured to inhibit or prevent fluid from leaking out of electrically-actuated valve assembly 104 and spray nozzle 106 when valve assembly 104 is shut off. More specifically, mechanically-actuated valve 108 is a check valve that is activated when a pressure differential across the check valve exceeds a threshold pressure. Mechanically-actuated valve 108 of the example embodiment is a diaphragm check valve. That is, mechanically-actuated valve 108 includes a diaphragm 120 that is positionable between a sealed position (shown in FIG. 11) and an unsealed position (shown in FIG. 10). Diaphragm 120 contacts a valve seat 122 of body 102 and prevents fluid from flowing through a cavity 124 of body 102 when diaphragm 120 is in the sealed position. In the unsealed position, diaphragm 120 flexes outward and away from valve seat 122 such that diaphragm is spaced from valve seat 122 and allows fluid to flow through cavity 124 of body 102. Diaphragm 120 may be a flexible member that is displaceable between the unsealed and sealed positions based on pressure changes within nozzle assembly 100. For example, diaphragm 120 may move from the sealed position to the unsealed position when a pressure within nozzle assembly 100 exceeds the threshold pressure.

In the example embodiment, mechanically-actuated valve 108 is coupled to body 102 along fluid flow path 116 upstream of electrically-actuated valve assembly 104. Accordingly, fluid flows from mechanically-actuated valve 108 to electrically-actuated valve assembly 104 when diaphragm 120 is in the unsealed position. In the example embodiment, electrically-actuated valve assembly 104 is a direct acting solenoid valve that includes an actuator 126 configured to pulse with a timing, duration, frequency, and duty cycle determined by controller 60 (shown in FIG. 8). Controller 60 controls electrically-actuated valve assembly 104 to allow fluid to flow out of an outlet 128 at second end 114 of body 102 and be dispensed from nozzle assembly 100 through spray nozzle 106. When electrically-actuated valve assembly 104 is off, fluid flow through nozzle assembly 100 is stopped and mechanically-actuated valve 108 is in the sealed position to prevent fluid from leaking out of nozzle assembly 100.

In the example embodiment, electrically-actuated valve assembly 104, spray nozzle 106, and mechanically-actuated valve 108 are releasably coupled to body 102. Specifically, electrically-actuated valve assembly 104, spray nozzle 106, and mechanically-actuated valve 108 are threadably engaged with threaded sidewalls of body 102. In alternative embodiments, electrically-actuated valve assembly 104, spray nozzle 106, and mechanically-actuated valve 108 may be attached to body 102 using fasteners or any other suitable attachment means.

The configurations of body 102, electrically-actuated valve assembly 104, and mechanically-actuated valve 108 enable nozzle assembly 100 to have a compact shape and a reduced size in comparison to other nozzle assemblies. In addition, nozzle assembly 100 may be simpler and less expensive to manufacture than other nozzle assemblies. Moreover, electrically-actuated valve assembly 104, mechanically-actuated valve 108, and spray nozzle 106 may be easier and less expensive to remove, repair, and/or replace than components of conventional nozzle assemblies.

While, in some embodiments, the described methods and systems are used to handle a fluid that is applied to agricultural fields, such as an herbicide or a pesticide, the described methods and systems may be used for handling any type of fluids, not just fluids for use in the agricultural industry. Moreover, while the methods and systems are described herein as applying fluids to crops and/or the ground in some embodiments, it should be understood that the methods and systems are described herein may be used to apply fluids other than to crops and/or the ground, including water, trees, and insects.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. An aerial fluid dispersal system for use with an aerial vehicle, the aerial fluid dispersal system comprising:

a fluid reservoir configured to hold a quantity of fluid;

a boom pipe coupled in fluid communication with and downstream of said fluid reservoir, said boom pipe oriented in a direction perpendicular to a travel direction of the aerial vehicle;

a fluid pump coupled in fluid communication with said fluid reservoir and said boom pipe for generating a flow of pressurized fluid in said boom pipe;

a plurality of nozzle assemblies coupled in fluid communication with said boom pipe and spaced apart from one another in a direction perpendicular to the travel direction of the aerial vehicle, wherein at least a portion of each nozzle assembly is positioned external to said boom pipe, each nozzle assembly of said plurality of nozzle assemblies including:

a pulse-width modulated (PWM) valve coupled downstream of the boom pipe;

a single spray nozzle fluidly coupled downstream of the PWM valve and configured to emit the pressurized fluid based on an operating parameter of the PWM valve, wherein the plurality of nozzle assemblies includes a single spray nozzle for each of the PWM valves such that there is a one-to-one correspondence of spray nozzles and PWM valves; and a check valve fluidly coupled in series with the PWM valve; and a controller coupled to said fluid pump and said plurality of nozzle assemblies, said controller configured to control the operating parameter of the PWM valve of each nozzle assembly.

2. The aerial fluid dispersal system of claim 1, wherein the check valve is an in-line check valve.

3. The aerial fluid dispersal system of claim 2, wherein the check valve is one of a piston check valve and a ball check valve.

4. The aerial fluid dispersal system of claim 1, wherein the check valve is fluidly coupled between the boom pipe and the PWM valve.

5. The aerial fluid dispersal system of claim 1, wherein the check valve is fluidly coupled between the PWM valve and the spray nozzle.

6. The aerial fluid dispersal system of claim 1, wherein the check valve is activated when a pressure differential across the check valve exceeds a threshold pressure in a range of about 1 psi to about 20 psi.

7. The aerial fluid dispersal system of claim 1 further comprising at least one shell coupled to at least one nozzle assembly of the plurality of nozzle assemblies such that the PWM valve and the check valve of the nozzle assembly are positioned within a protective cavity defined by the shell.

8. The aerial fluid dispersal system of claim 1, wherein the check valve is a diaphragm check valve.

9. A method of dispensing fluid using an aerial fluid dispersal system, the aerial fluid dispersal system including a boom pipe, a fluid reservoir, and a fluid pump, the method comprising:

generating a flow of pressurized fluid in the boom pipe using the fluid pump, the fluid pump coupled in fluid communication with the fluid reservoir and the boom pipe, the boom pipe coupled in fluid communication with and downstream of the fluid reservoir;

dispensing the pressurized fluid through a plurality of nozzle assemblies coupled in fluid communication with the boom pipe, wherein at least a portion of each nozzle assembly is positioned external to the boom pipe, each nozzle assembly of the plurality of nozzle assemblies including:

a pulse-width modulated (PWM) valve coupled downstream of the boom pipe;

a single spray nozzle fluidly coupled downstream of the PWM valve and configured to emit the pressurized fluid based on an operating parameter of the PWM valve, wherein the plurality of nozzle assemblies includes a single spray nozzle for each of the PWM valves such that there is a one-to-one correspondence of spray nozzles and PWM valves; and a check valve fluidly coupled in series with the PWM valve; and controlling an operating parameter of the PWM valve of each nozzle assembly using a controller coupled to the fluid pump and the plurality of nozzle assemblies.

10. The method of claim 9 further comprising activating the check valve when a pressure differential across the check valve exceeds a threshold pressure, wherein the threshold pressure is in a range of about 1 psi to about 20 psi.

11. The method of claim 10, wherein the check valve is fluidly coupled between the boom pipe and the PWM valve.

12. The method of claim 10, wherein the check valve is fluidly coupled between the PWM valve and the spray nozzle.

13. The method of claim 9 further comprising moving a valve member of the check valve along an axis, wherein the check valve is an in-line check valve and includes an inlet and an outlet arranged along the axis.

14. The method of claim 9 further comprising stopping the flow of pressurized fluid, wherein the check valve is configured to prevent leakage of the fluid from the corresponding spray nozzle when the flow of pressurized fluid is stopped.

15. The method of claim 9, wherein controlling the operating parameter of the PWM valve of each nozzle assembly comprises sending a signal from the controller to vary a pulse frequency or duty cycle of the PWM valve of each nozzle assembly.

16. The method of claim 9 further comprising controlling an operating parameter of the fluid pump to achieve variable pressures of the fluid in the aerial fluid dispersal system.

17. An aerial fluid dispersal system for use with an aerial vehicle, the aerial fluid dispersal system comprising:

a fluid reservoir configured to hold a quantity of fluid;

a boom pipe coupled in fluid communication with and downstream of said fluid reservoir, said boom pipe oriented in a direction perpendicular to a travel direction of the aerial vehicle;

a fluid pump coupled in fluid communication with said fluid reservoir and said boom pipe for generating a flow of pressurized fluid in said boom pipe;

a plurality of nozzle assemblies coupled in fluid communication with said boom pipe and spaced apart from one another in a direction perpendicular to the travel direction of the aerial vehicle, wherein at least a portion of each nozzle assembly is positioned external to said boom pipe, each nozzle assembly of said plurality of nozzle assemblies including:

a pulse-width modulated (PWM) valve coupled downstream of the boom pipe; and a single check valve fluidly coupled in series with the PWM valve, wherein the plurality of nozzle assemblies includes a single check valve for each of the PWM valves such that there is a one-to-one correspondence of check valves and PWM valves; and a controller coupled to said fluid pump and said plurality of nozzle assemblies, said controller configured to control an operating parameter of the PWM valve of each nozzle assembly.

18. The aerial fluid dispersal system of claim 17, wherein the check valve is activated when a pressure differential across the check valve exceeds a threshold pressure, and wherein the threshold pressure is in a range of about 1 psi to about 20 psi.

19. The aerial fluid dispersal system of claim 17, wherein the check valve is a diaphragm check valve.

20. The aerial fluid dispersal system of claim 17, wherein the check valve is an in-line check valve.

* * * * *